(12) United States Patent
Cerullo

(10) Patent No.: US 11,349,431 B1
(45) Date of Patent: May 31, 2022

(54) LIFT ASSIST SOLAR PANEL APPARATUS

(71) Applicant: Robert J. Cerullo, Huntington Beach, CA (US)

(72) Inventor: Robert J. Cerullo, Huntington Beach, CA (US)

( * ) Notice: Subject to any disclaimer, the term of this patent is extended or adjusted under 35 U.S.C. 154(b) by 0 days.

(21) Appl. No.: 17/308,467

(22) Filed: May 5, 2021

(51) Int. Cl.
*H02S 20/30* (2014.01)
*H02S 20/23* (2014.01)

(52) U.S. Cl.
CPC .............. *H02S 20/30* (2014.12); *H02S 20/23* (2014.12)

(58) Field of Classification Search
CPC .......... H02S 20/22; H02S 20/23; H02S 20/24; H02S 20/30
See application file for complete search history.

(56) References Cited

U.S. PATENT DOCUMENTS

| 5,720,452 | A | 2/1998 | Mutschler |
| 9,038,329 | B2 | 5/2015 | Pelman |
| 10,024,579 | B1 | 7/2018 | Grovar et al. |
| 10,461,684 | B1 * | 10/2019 | Rubin ..................... H02S 20/23 |
| 10,601,363 | B1 | 3/2020 | Rubin |
| 2009/0029386 | A1 | 12/2009 | Augenbraun |
| 2010/0026988 | A1 | 10/2010 | Reinhold |
| 2011/0002386 | A1 | 2/2011 | Muchow |
| 2012/0002434 | A1 | 2/2012 | Kalman |
| 2013/0008263 | A1 | 4/2013 | Eaton |
| 2015/0010199 | A1 | 4/2015 | Nayar |

FOREIGN PATENT DOCUMENTS

| DE | 102006010781 | 9/2007 |
| DE | 202007003128 | 9/2007 |
| DE | 102009021406 | 11/2010 |
| KR | 101981972 | 8/2019 |
| WO | WO2016/154074 | 9/2016 |

* cited by examiner

*Primary Examiner* — Daniel P Malley, Jr.
(74) *Attorney, Agent, or Firm* — Fulwider Patton LLP

(57) ABSTRACT

A solar panel carried from a frame and biased toward an elevated position to assist in lifting to expose the underlying roof area.

1 Claim, 4 Drawing Sheets

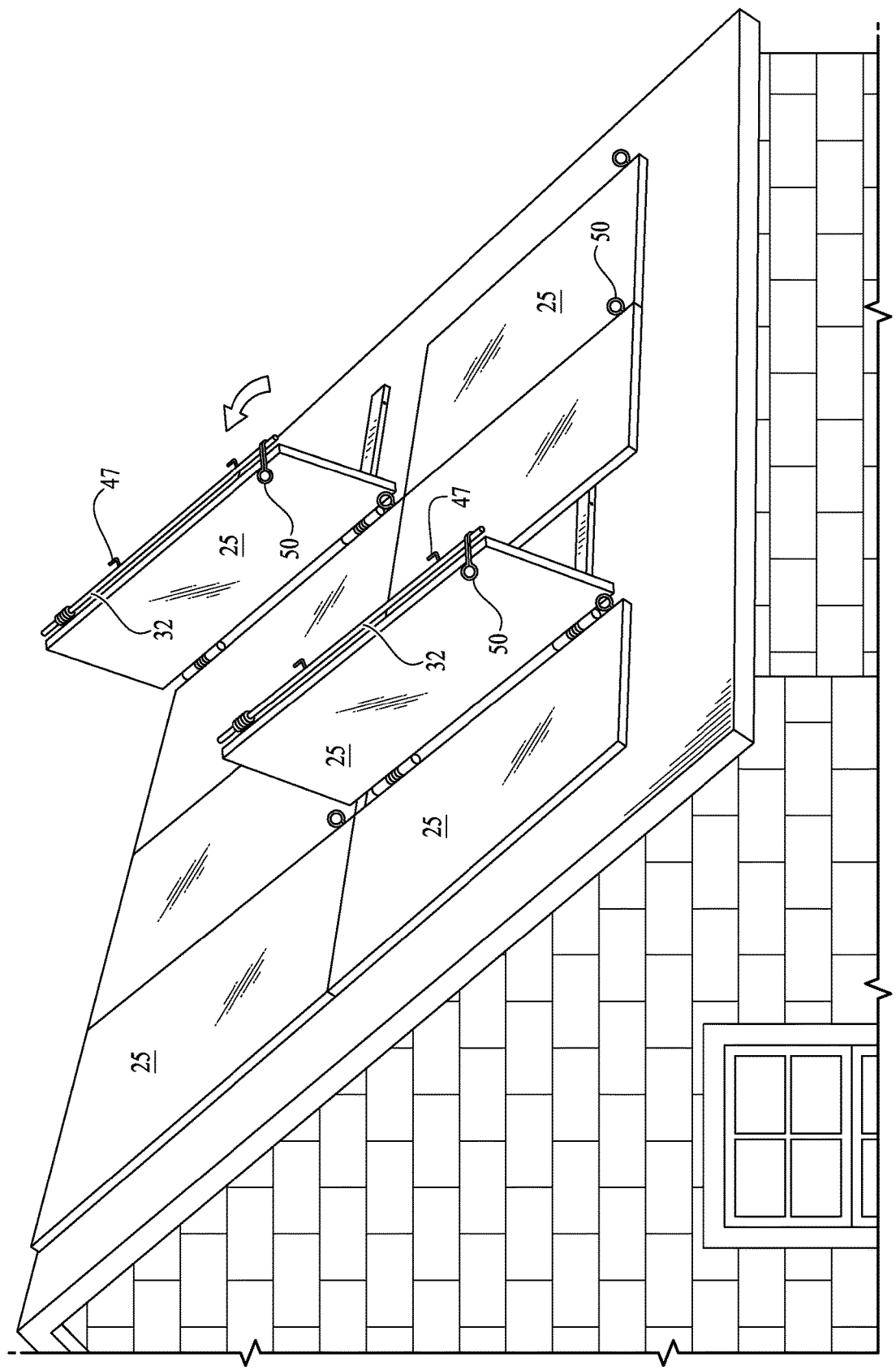

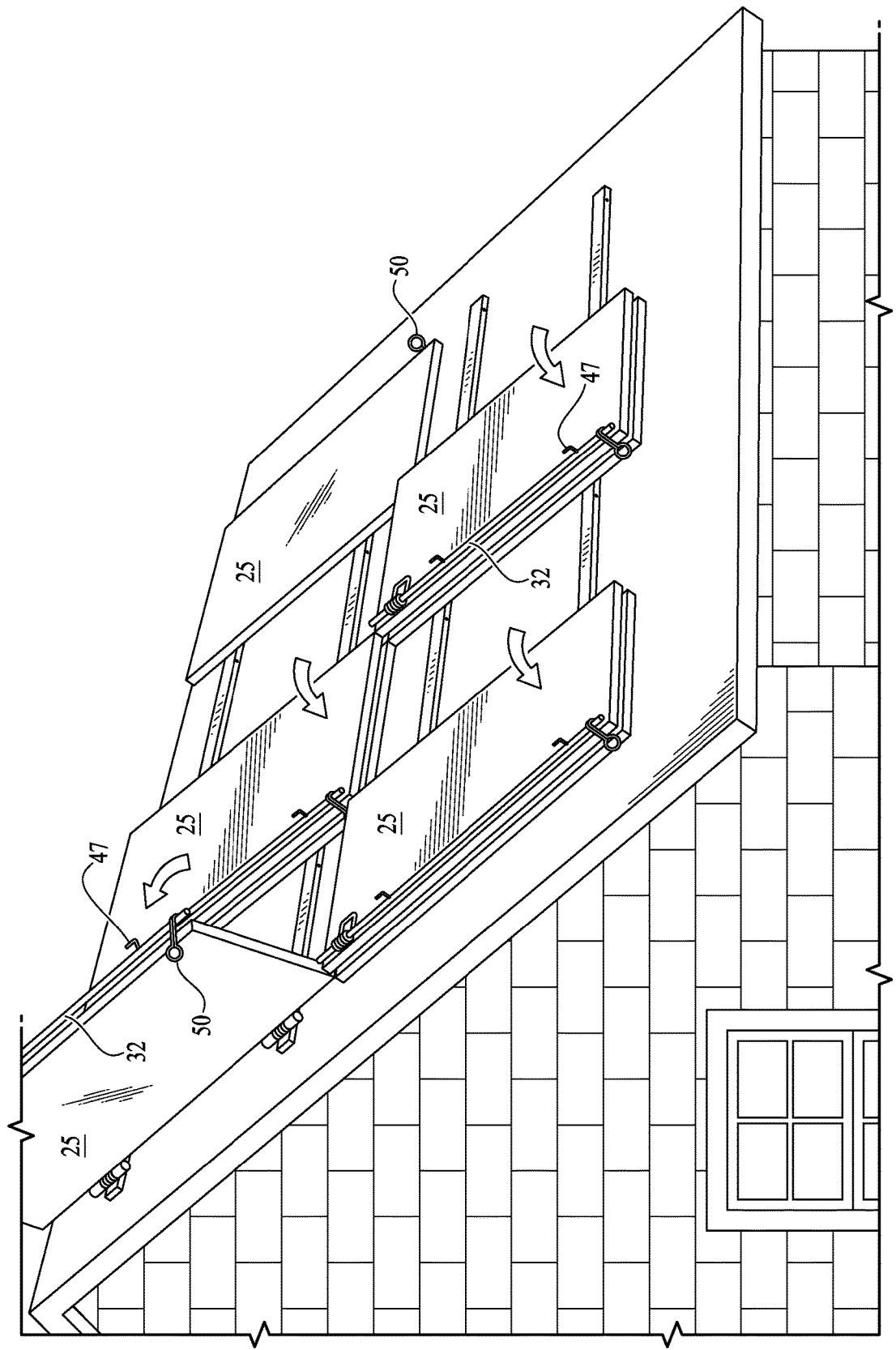

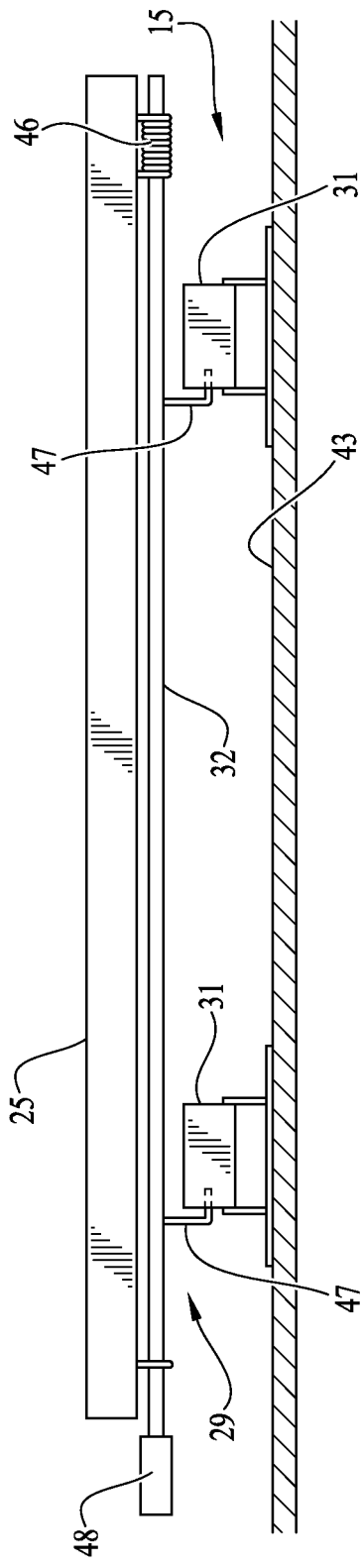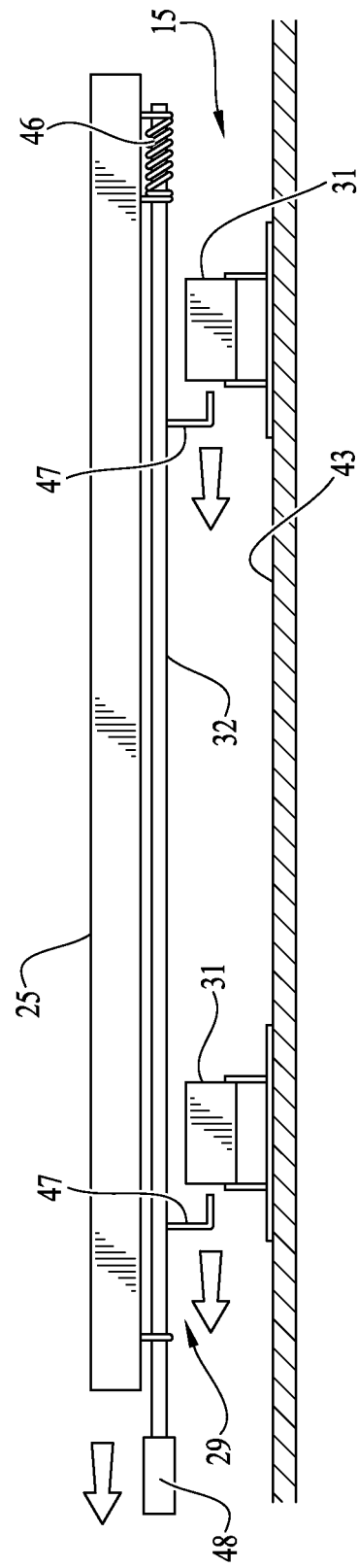

LIFT ASSIST SOLAR PANEL APPARATUS

BACKGROUND OF THE INVENTION

This invention relates to solar panel devices, and more particularly to solar panel devices adapted to be mounted on roofs or the like.

For some embodiments, I selected the biasing device as a coil spring tending to raise the panel to a fully raised position depending on the particular task undertaken. As will be appreciated by those of skill in the art, solar panel apparatus in the present invention can be installed as an individual unit, in pairs or ganged together as the application may dictate. The device can be installed to open to the right or left as desired. For my commercial embodiment, I selected the frame material of aluminum preferably with a plain finish.

DESCRIPTION OF PRIOR ART

While present day solar panel art is some 60 years old, the discoveries that led to solar cells themselves began some 200 years ago with the discovery of the relationship between properties of light and conductivity. A photovoltaic effect is a process where light is absorbed by a material to create electrical voltage. This effect was discovered more than 150 years ago.

In the late 1800s, Charles Fritts created the first solar cell by coating selenium with a thin layer of gold.

The German physicist Hendrik Hertz observed the photoelectric effect where light is used to free electrons from a solid surface to create power.

By the mid-1950s, Bell Laboratories discovered that silicon is more efficient than selenium, and created the first practical solar cell with an efficiency of some 6%.

In the 1970s, with the price of oil on the rise, and the demand for solar power increasing, Exxon Corporation financed research to create solar cells made from lower-grade silicon and cheaper materials.

Arco Solar reputed to have built the first solar park in Hesperia, California, generating some 1000 kilowatts per hour when operating at full capacity.

In 1995, Thomas Flaude filed a patent application for a retractable awning with integrated solar cells to be used with a recreational vehicle.

By the year 2010, power plants in California generated just over 15% of the electricity production from renewable sources. By 2011, the overall production of renewable energy has grown to 27%, with solar power accounting for most of that increase. The efficiency and plummeting prices of solar panels has contributed to their popularity. The average cost of solar power for residential, commercial and utility-scale projects declined 73% between 2010 and 2016. Los Angeles Times, Jun. 25, 2017. One solar farm near San Luis Obispo, Calif. spreads over some seven square miles. When the sun shines over the Topaz Solar Farm, the shimmering solar panels produce enough electricity to power all of the residential homes in a city of nearly 500,000.

These solar farms, of course, create a transmission challenge for transmitting over the grid to remote users. Many residential houses in the southwest sport solar panels on their rooftops for local use and possible transmission to the grid.

A persuasive example of the need for practical individual residential installations arises from winter 2021 outage in Texas. The U.S. has three power grids: one covers the easter U.S.; another the western states and the Texas grid covers the entire state of Texas. The grid has been thrust into the national spotlight as extreme energy demand and overloaded frozen utility plants contribute to widespread power outages in, for instance Texas. It was reported that nearly 4.5 million customers went without electricity. Texans went a day full day without lights turned on. Power outage.ushtps://power-outage.us/. After 3 days, over 3.1 million were left without power. Rolling blackouts are becoming a daily event.

Utility providers have seen the effect of the shift to solar. It is reported that California's three investor-owned utilities have proposed changes in the state's rooftop-solar program that would lead to new connection charges and lower compensation for customers who install panels on their homes. California Utilities recognize the growth in the solar industries but believe that there is an inequity for customers without rooftop system paying $3 billion more annually to subsidize rooftop customers. It is reported that the California program paying residents for their excess clean power has led to more than 1 million installing solar panels on their homes. Until now, these installation have presented an obstacle to accessing the underlying roof in a timely fashion when emergencies arise.

The use of solar energy cannot help but detract from the demand for additional investment of billions of dollars to build or refurbish natural gas power plants and the like, thereby contributing to the economy. In the summer of 2020, California, during a record heat wave, experienced rolling blackouts which left 800,000 homes and businesses without power. That means, gas-fired power plants could be called on for even more, even during a time when the state is trying to wean itself from fossil fuels.

The shortage has forced state regulators to extend the life of outdated gas-fired power generators in Huntington Beach, Long Beach, Redondo Beach and Oxnard, Calif., all of which had been scheduled to shut down. The need to harvest solar energy in California has been driven even more with the scheduling of closure for the Diablo Canyon nuclear plant and several gas fired plants. Thus, there exists a need for other forms of solar energy harvesting.

The move toward solar energy has led to a demand for solar panel equipment which is inexpensive to install, convenient to use and trouble free to operate and repair. It may be cost effective to prefabricate solar photovoltaic sources carried on separate frames to be mounted on mobile units or on stationary sites. A system for mounting from adjustable frames and to be ganged together is shown in U.S. Pat. No. 8,716,889 to Vaidyanathan. While beneficial for mobile units, such devices are not suited for rooftop mounting.

Transmission grids for distributing electricity over long distances may become overloaded. While serving to reduce the load on the transmission grid, solar panels mounted on individual roofs add a complication to maintenance of the roofs, as well as the electronics in the panels. Dirt and debris often collect under the panels. To unbolt and prop up the panels for cleaning underneath creates safety challenges and is time consuming. Safety concerns are raised stemming from large areas of the roof being covered and not directly accessible, particularly in the case of fire, when firemen sometimes need to gain direct access to the flames by cutting or chopping holes through the roof. The restriction on access from panels covering rooves is of concern to firefighters as well as insurance carriers, particularly when a group of such panels are clustered together across large areas.

It has been proposed to mount panels on a rack which can be elevated and/or angled for favorable incidence of the sun's rays. It has also been proposed to mount such panels in a frame such that they may be elevated for access to their electronics and the roof below. However, solar panels can be relatively heavy, on the order of 20 to 50 pounds per panel, and can be somewhat unwieldly to handle. This, then, often leads to challenges in lifting or elevating the panels, and can readily contribute to back and neck injuries to the workmen seeking to manipulate the panels, particularly on a sloped roofs or the like.

This problem is exacerbated by steeper pitched roofs and, also, by the fact that a panel separated from its frame may be subjected to oncoming winds, causing it to act as a sail leaving the workman with the dilemma of either letting the panel loose to sail off in the wind, or risking his or her health and well-being by clinging to the panel seeking to prevent the disengaged free flight thereof. A panel weighing 20 or 30 pounds, whether released in the wind to fall to the ground or taking the workman with it, creates an undue risk for the workman as well as passersby.

Workmen accessing solar panels, particularly on sloped or pitched roofs, are often required to maneuver about in bent over or stooped positions, typically bending to one side or the other, loading the spine in an uneven manner, thereby subjecting the soft tissues to strain and the nerves to pinching, particularly when the weight of the panel is lifted. Props, struts and frames have been proposed to support solar panels at various selected angles. The workman is still left with the task of manually lifting the weight of the panel to gain access to the underlying surface, thus exposing himself or herself to physical injury and/or fatigue.

These problems associated with the mounting of solar panels to various roof constructions have long been recognized. In recognition of these problems it has been proposed to provide a sub-frame for support of a solar panel with support struts to adjustably elevate one end or side thereof. A device of this type is shown in U.S. Pat. No. 9,038,329 to Pelman. While helpful for adjusting the inclination of a panel, such devices leave the workman with the challenge and risk involved in manual lifting of the panel itself for maintenance or the like, particularly when mounted on an inclined or pitched roof.

Other efforts to provide mounting devices for solar panels have led to proposals of various articulated tracks or frames which may be elevated at one end or the other or at the opposite sides to incline the panel in accordance with the particular mounting environment. Devices of this type are shown in U.S. Patent Publication Nos. 2011/0023867 to Muchow and 2015/0101996 to Mayer. Workmen are then forced to climb around the framework and walk over the roof surface and bend over to manipulate the panels, thus incurring the risk of falling and personal injury, exacerbated by being forced to lift while bent over, possibly stretched to one side, placing extensive strain on vertebra discs and soft tissue of the spine and back. There is thus a need for an apparatus which will provide an assist to lifting the panel for repair and maintenance.

Local fire departments and municipalities have addressed the issues with many different approaches. On Feb. 20, 2017, an article was published in the Belleville News-Democrat recognizing that by this time solar panels are everywhere and present new challenges for those mounted on rooftops. It is said that one of the first things a firefighter does in a structure fire is cut the power for safety. But how do you do that when the power isn't coming from utility grid? How do the firefighters ventilate a roof when it's covered in solar panels without electrocuting themselves? Is it safe for a fire fighter in full gear to step on a solar panel? The answer is no, according to fire rescue magazine. As solar power systems continue to proliferate, the likelihood of firefighters encountering them at a structure fire is expected to increase. Thus, the need exists for a practical roof mounted solar system which can be activated to quickly clear the way to the underlying roof.

SUMMARY OF THE INVENTION

The present invention includes a framework having a base to which one end of a solar panel is associated, and a lifter interposed between the frame and panel for applying an assist force to the panel itself to assist in the lifting thereof, or even to bias one end of the panel to an elevated position.

In some embodiments the workman need only release a latch and lift one side of the panel under influence on the lift assist to clan the roof, repair the panel or, in the event of fire, gain access to the roof.

The features and advantages of the invention will be more readily understood from the following detailed description which should be read in conjunction with the accompanying drawings.

BRIEF DESCRIPTION OF THE DRAWINGS

FIG. 2 is a second perspective view of a solar panel apparatus embodying my invention;

FIG. 3 is perspective view similar to FIG. 2 showing various panels being folded over; and FIGS. 4 and 5 are side views, in enlarge scale, partially in section, of the apparatus shown in FIG. 1 and depicting the solar panels locked down and released, respectively.

DETAILED DESCRIPTION OF THE PREFERRED EMBODIMENTS

Figure 1:
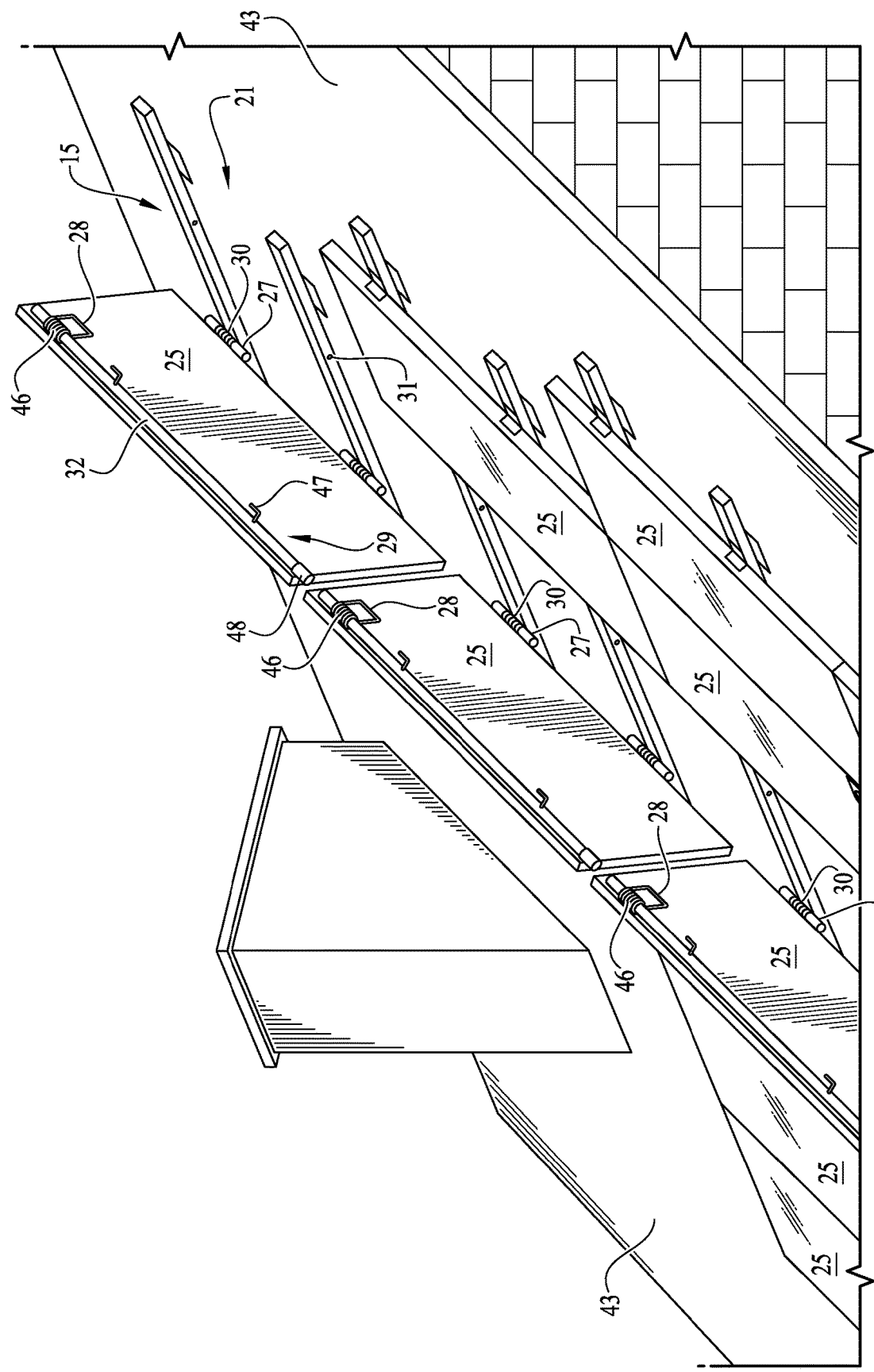
FIG. 1 is as perspective view of a solar panel apparatus embodying my invention and depicting one row of panels being raised.

Referring now in more detail to the exemplary drawings for purposes of illustrating embodiments of the invention, wherein like reference numerals designate corresponding or like elements among the several views.

Typically, prior solar panel devices are mounted on roofs, thus hindering access to the roof for repair or for gaining access to the roof in case of a fire when fireman may want to chop or saw a hole in the rough for access to the fire. Additionally, workmen seeking access the panels must tread on the roof surface, which particularly for a pitched roof, requires gripping by the shoe soles and often does damage to the roof covering, whether composition, shake, or cedar shingles.

The solar panel apparatus of the present invention includes, generally, a support frame 15 supported on stanchions and forming an opening 21 for receiving a solar panel 25. The solar panel 25 has proximal and distal sides and is nested or otherwise connected at its proximal side on one side of the frame 15 and may be captured by a hinge 27. The proximal side may be associated with the frame as by nesting in a recess or groove or connected by a latch, or as shown, connected by the hinge 27. In some embodiments the apparatus includes a latch device 29 on the underside of the free extremity for releasable latching to a catch 31 on the frame 15. As will be appreciated by those skilled in the art, attachment to the frame may take many different forms and can even be in the form of a recess in the frame to receive the peripheral edges of the panel, understanding that the assist may be in the form of a spring loaded kicker mounted in the frame to be lowered from an elevated position under the weight of the panel but still provide an assist force to the panel.

The frame 15 may be rectangular to form the rectangular opening 21. One side of the panel 25 may be nested in a groove (not shown) or carried on the hinge 27 incorporating a biasing device such as a coil spring 30 or the like telescoped over a hinge rod and having a sufficiently high spring coefficient to, when the panel is released from the catch 31, raise the free side of the panel through about 90 degrees without manual assistance. In the preferred embodiment the catch is in the form of an open ended bore formed in the underlying frame.

In some embodiments, the spring, acting as the biasing device, acts as an assist so that only minimal force need be applied by the worker lifting the panel.

For the purpose of illustration, I mount an inverter 28 on the underside of the free edges of the panels. As appreciated by those of skill, these converters may take many different forms, such as sting inverters, micro-inverters, power optimizers, and the lithe.

The frame 15 may be carried on support stanchions mounted on the top of the roof 43.

The latch device 28 may be in the form of a spring-loaded rod 32 mounted slidable on the free edges of the respective panels 25 and biased to the right as viewed in FIG. 1 by coil springs 46. The respective right ends of the rods mount diametrically projecting, L-shaped latch pins 47 having horizontal legs which align with openings in the respective left hand ends are formed with respective handles 48 for manipulating the rods so as to latch the pins in the respective catches 31 mounted on the frames.

As will be appreciated by those skilled in the art, the latches may take many different forms, such as spring loaded clips, hooks, cranks and the like. In some embodiments I have found latches to be unnecessary for performance under mild conditions without significant weather disturbance.

In operation, it will be appreciated that workman may install stanchions on the roof 43 to support the frame of various solar panel assemblies in place and facing a favorable direction to catch the solar energy.

The frames may be installed in a desired array across the surface of the roof 43 to place the solar panels in favorable positions and clusters to gather solar energy. The panels may be closed down on the frames and, for some embodiments include latches, latched in place. Should the occasion then arise where access must be had to the roof, either for patching or possibly by first responders to chop, saw or otherwise cut through the roof to access the source of a fire. The latches may be unlatched, and the handles 50 grasped to raise the free sides of the respective panels to expose the roof, all with minimal effort under influence of the assist springs 46 and serving to expose the underlining roof. As will be appreciated by those working in the field, this unlatching and lifting of the panels may be achieved with a minimum of effort, even by long reach tools to engage releasable fasteners on the handles 48 and/or lifter cleats mounted on the free side of the panels.

From the foregoing it is evident that the present invention provides an economical and effective solar assembly and method of use for deploying solar panels about the roof of an establishment, and yet providing for ready access to the roof or electronics of the respective panels without subjecting the workmen to excessive loads when lifting and hoisting panels.

The invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

The invention claimed is:

1. A solar panel assembly comprising:
   a rectangular support frame including base and head cross beams spaced apart by a separation distance, the rectangular support frame including catches on each lateral surface of the base and head cross beams;
   a solar panel formed with proximal and distal sides, the solar panel having a length greater than the separation distance between the rectangular support frame's base and head cross beams, and the solar panel further comprising a spring loaded rod slidably mounted on a free edge, the spring loaded rod carrying L-shaped pins positioned to each engage one catch on the lateral surface of the base and head cross beams when the spring loaded rod is moved in a direction parallel to the free edge of the solar panel;
   a plurality of hinges mounting an edge of the solar panel opposite the free edge to the rectangular support frame, at least one of said hinges located at each base cross beam and at least one of said hinges located at each head cross beam; and
   a coil spring mounted on the hinges for rotation of the solar panel about the hinges, the coil spring having a spring coefficient sufficient to rotate the free edge of the solar panel to an elevated position;
   whereby rotation of the solar panel about the plurality of hinges is actuated when the spring-loaded rod is slid, against a bias of the coil spring, longitudinally along the edge of the solar panel opposite the free edge, such that the L-shaped pins disengage with their respective catches on the lateral surface of the base and head cross beam to permit rotation of the solar panel.

* * * * *